United States Patent [19]

Takikawa et al.

[11] Patent Number: 4,930,458

[45] Date of Patent: Jun. 5, 1990

[54] THERMOSENSITIVE HYDRAULIC FAN COUPLING

[75] Inventors: Kazunori Takikawa; Yuichi Ono, both of Numazu, Japan

[73] Assignee: Usui Kokusai Sangyo Kaisha Ltd., Shizuoka, Japan

[21] Appl. No.: 369,308

[22] Filed: Jun. 21, 1989

[30] Foreign Application Priority Data

Jun. 24, 1988 [JP] Japan .................. 63-156282

[51] Int. Cl.$^5$ .............................................. F01P 7/02
[52] U.S. Cl. .................................. 123/41.12; 192/82 T
[58] Field of Search ............... 123/41.11, 41.12, 41.49, 123/41.65; 192/82 T, 58 B

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 123/41.12 |
| 3,059,745 | 10/1962 | Tauschek | 123/41.12 |
| 3,217,849 | 11/1965 | Weir | 123/41.12 |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,727,735 | 4/1973 | La Flame | 123/41.12 |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/82 T |
| 4,281,750 | 8/1981 | Clancey | 192/82 T |
| 4,403,684 | 9/1983 | Haeck | 192/82 T |
| 4,505,367 | 3/1985 | Martin | 192/82 T |
| 4,629,046 | 12/1986 | Martin | 192/58 B |
| 4,665,694 | 5/1987 | Brunken | 192/82 T |
| 4,667,791 | 5/1987 | Martin et al. | 192/58 B |
| 4,685,549 | 8/1987 | Brunken et al. | 192/82 T |
| 4,699,258 | 10/1987 | Johnston et al. | 192/82 T |
| 4,796,571 | 1/1989 | Ono et al. | 123/41.12 |

FOREIGN PATENT DOCUMENTS

| | | |
|---|---|---|
| 55-76226 | 6/1980 | Japan . |
| 57-167533 | 10/1982 | Japan . |
| 57-179431 | 11/1982 | Japan . |
| 59-7846 | 2/1984 | Japan . |
| 62-124330 | 6/1987 | Japan . |

Primary Examiner—Noah P. Kamen
Attorney, Agent, or Firm—Anthony J. Casella; Gerald E. Hespos

[57] ABSTRACT

A thermosensitive hydraulic fan coupler for an automobile engine, which allows a suitable amount of air to be supplied to the engine in accordance with the travelling condition of the automobile through the rotation of a fan is provided. The fan coupling according to the present invention is provided with an idle oil chamber and a specific dam within the former adjacent the oil circulation passage between the oil chamber and the torque transmission chamber with the dam serving as an opening and closing mechanism so that in addition to the effects of preventing the generation of abnormal fan noises and promoting an warming-up operation of the engine, it can more effectively prevent the phenomenon of "attendant rotation" of the driven side of the coupling immediately after restarting the engine.

6 Claims, 4 Drawing Sheets

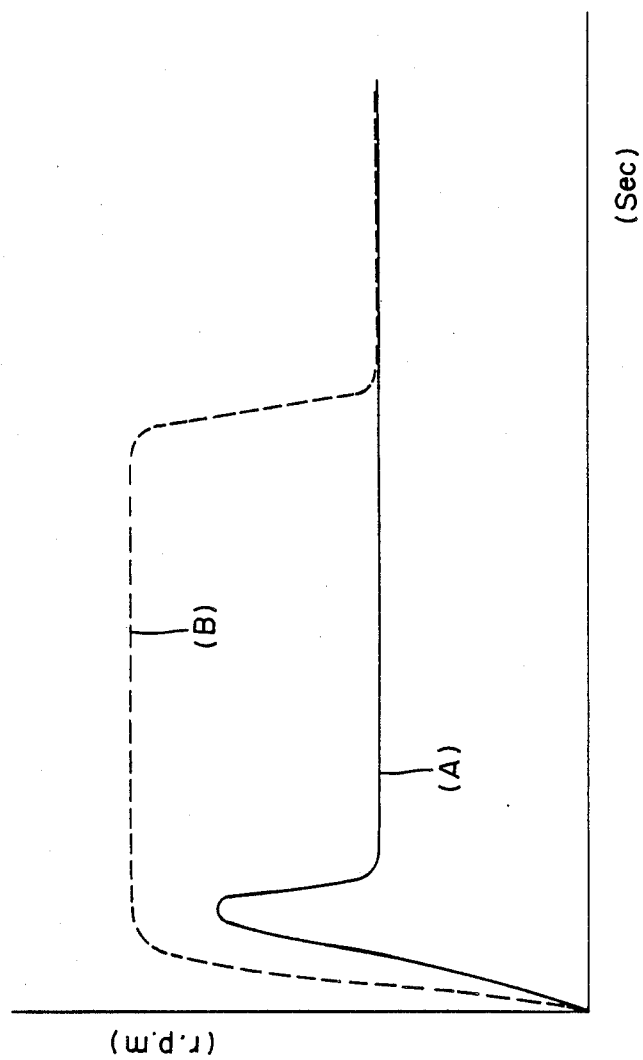

THERMOSENSITIVE HYDRAULIC FAN COUPLING

BACKGROUND OF THE INVENTION

The present invention relates to a thermonsensitive hydraulic fan coupling generally adapted to constantly supply to the engine of a vehicle an amount of cooling air corresponding to the travelling condition of the vehicle. It provides an improvement in the invention disclosed in the applicant's Japanese Patent Publication No. 59-7846.

DESCRIPTION OF THE PRIOR ART

The conventional fan coupling of the above type has had the following structure. That is, as shown in FIG. 5, a sealed space defined by a cover 23' and a casing 23" is divided into an oil chamber 25 and a torque transmission chamber 26 housing a drive disk 22 therein, by means of partition plate 24 having an oil flow adjusting hole 24'. Further, an oil circulation passage 27 is provided continuous with a pumping section in the form of a dam 28 interposed between the circulation passage 27 leading to the oil chamber 25, and the torque transmission chamber 26, and an inlet port 27' and an outlet port 27" for the passage 27 are so provided that the outlet port 27" is formed at an opening of the top end of a substantially semicircular groove 29 continuous with the circulation passage 27 defined by a wall surrounding the inner peripheral surface of the oil chamber 25 so that at least either one of the ports 27' and 27" lies on the level of the oil in the oil chamber 25 in any state of engine stoppage.

The above-described conventional fan coupling has been satisfactory in that when the engine stops in a state in which the oil circulation passage 27 is below the level of oil in the oil chamber 25, the natural reverse flow of the oil in the oil chamber 25 into the torque transmission chamber 26 through the oil circulation passage 27 is prevented and a sudden increase in the number of rotations of the fan immediately after restarting of the engine is checked so that the generation of abnormal fan noises is prevented and an effective warming-up of the engine in the cold season can be performed. However, as to the "attendant rotation" of the fan (that is, a phenomenon that the driven side or fan is forced to rotate in accordance with the speed of the engine and independent of engine cooling needs) which often takes place over a certain period of time when the engine is restarted, it has failed to fully display its function of preventing that phenomenon. That is, when the engine is operating at a high temperature, if it is stopped in a state in which the oil flow adjusting hole 24' of the partition plate 24 is below the level of the oil in the oil chamber 25 while the hole 24' is kept open by a valve means, a large amount of oil flows from the oil chamber 25 into the torque transmission chamber 26 due to a natural flow of the oil. Further, when the engine is restarted again thereafter, a part of the oil flowing from the torque transmission chamber 26 to the outer peripheral surface of the drive disk 22 flows reversely into the torque transmission chamber 26 due to the resistance of the dam 28 without being subjected to the pumping action of the dam that the above-mentioned "forced rotation" of the driven side including the fan takes place over a certain period of time as shown by the performance characteristics curve B of FIG. 6.

SUMMARY OF THE INVENTION

The present invention has been made to overcome the above-mentioned problems and an object of the invention is to provide a thermosensitive hydraulic fan coupler which, while preventing the generation of abnormal fan noises resulting from checking a sudden increase in the number of rotations of the fan immediately after starting the engine and promoting the engine warming-up operation, is capable of effectively preventing the "attendant rotation" of the driven side (including the fan) at the same time.

In order to achieve the above object, the present invention provides an improved structure of a fan coupler. That is, according to the present invention, there is provided a fan coupler including a sealed box supported, through a bearing, by a rotary shaft attached with a drive disk, and divided into an oil chamber and a torque transmission chamber by a partition plate with the drive disk being housed in the torque transmission chamber, a dam provided at a part of the inner peripheral surface of the sealed box facing the outer periphery of the drive disk around which oil collects, an oil circulation passage extending from the dam and establishing communication between the torque transmission chamber and the oil chamber and a valve means operative in response to a deformation of a thermosensitive member on the front face of the cover defining the sealed box such that when the ambient temperature exceeds a predetermined value, the valve means opens an oil flow adjusting hole of the above-mentioned partition plate while when the ambient temperature drops down below the value, it closes the hole, whereby the transmission of a torque on the rotary shaft to the drivenside sealed box is controlled by varying the effective area of contact of the oil in a torque transmission gap formed between the drive disk and the opposing inner circumferential surfaces of the cover and casing. Further, as an important feature of the invention, there is provided an idle oil chamber at the radially outermost portion of the inner peripheral wall the torque transmission chamber opposing the outer periphery of the drive disk so as to arrange the dam therein. This dam is made in the form of a platelike rocking strip pivotally supported by a pin at the center thereof at a position adjacent the inlet port of the oil circulation passage so that it is oriented forward in the rotational direction, and attached with a weight at one side thereof and a tension spring at the other side so as to constantly urge the weight toward the center of rotation of the platelike rocking strip so that the dam functions as an opening and closing mechanism in the idle oil chamber with respect to the oil circulation passage by making use of the centrifugal force applied on the weight. Where necessary, the platelike rocking strip as a dam may have an antiabrasive portion at least at one end thereof.

Thus, according to the fan coupling of the present invention having the above-described structure, when the engine is started, the oil which has so far remained in the torque transmission chamber is immediately directed to, and collected in, the idle oil chamber due to the centrifugal force generating as a result of rotation of the sealed box. Then the oil flows smoothly through the chamber due to the opening of the dam provided in the chamber so that the reverse flow of the oil into the torque transmission chamber which would otherwise take place due to the resistance of the dam is prevented, with the result that not only the cooling effect of the oil is improved but also the life thereof is extended and the phenomenon of "attendant rotation" of the driven side immediately after restarting of the engine is more effectively prevented. The operating condition of the fan coupling according to the present invention is shown by the performance characteristic curve A of FIG. 6 which will be described later.

BRIEF DESCRIPTION OF THE DRAWINGS

FIG. 6 is a graph showing comparative performance characteristic curves of the coupling of the present invention and a conventional coupling.

DETAILED DESCRIPTION OF PREFERRED EMBODIMENTS

Figure 1:
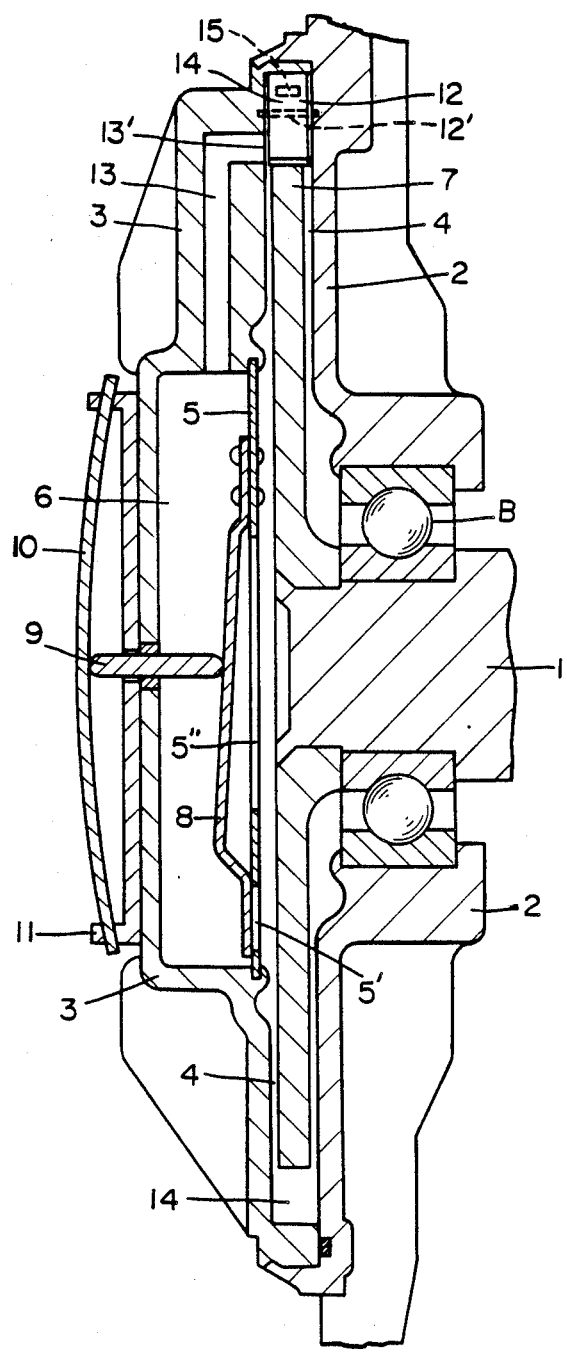
FIG. 1 is a vertical sectional view (partly cut away) of thermosensitive hydraulic fan coupling as one embodiment of the present invention.
Figure 2:
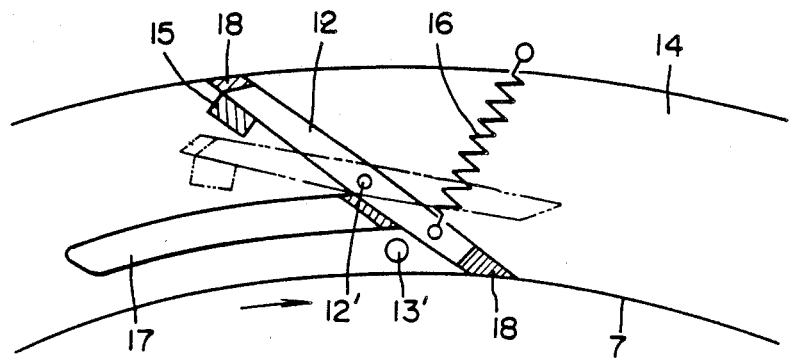
FIG. 2 is an illustrative view showing, on an enlarged scale, an open and a closed state of a dam as an essential portion of the invention.
Figure 3:
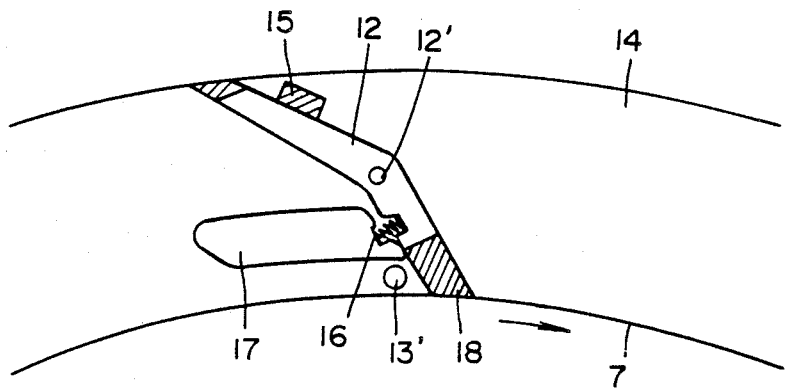
FIG. 3 is a constitutional diagram showing a state in which the dam according to another embodiment of the present invention is closed.
Figure 4:
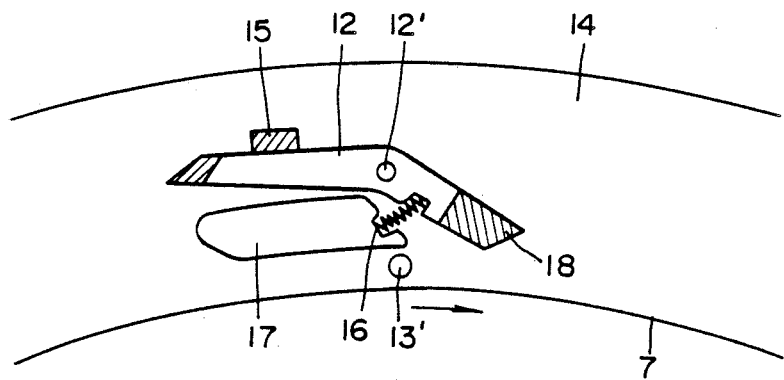
FIG. 4 is a constitutional diagram similar to FIG. 3 and showing a state in which the dam is open.
Figure 5:
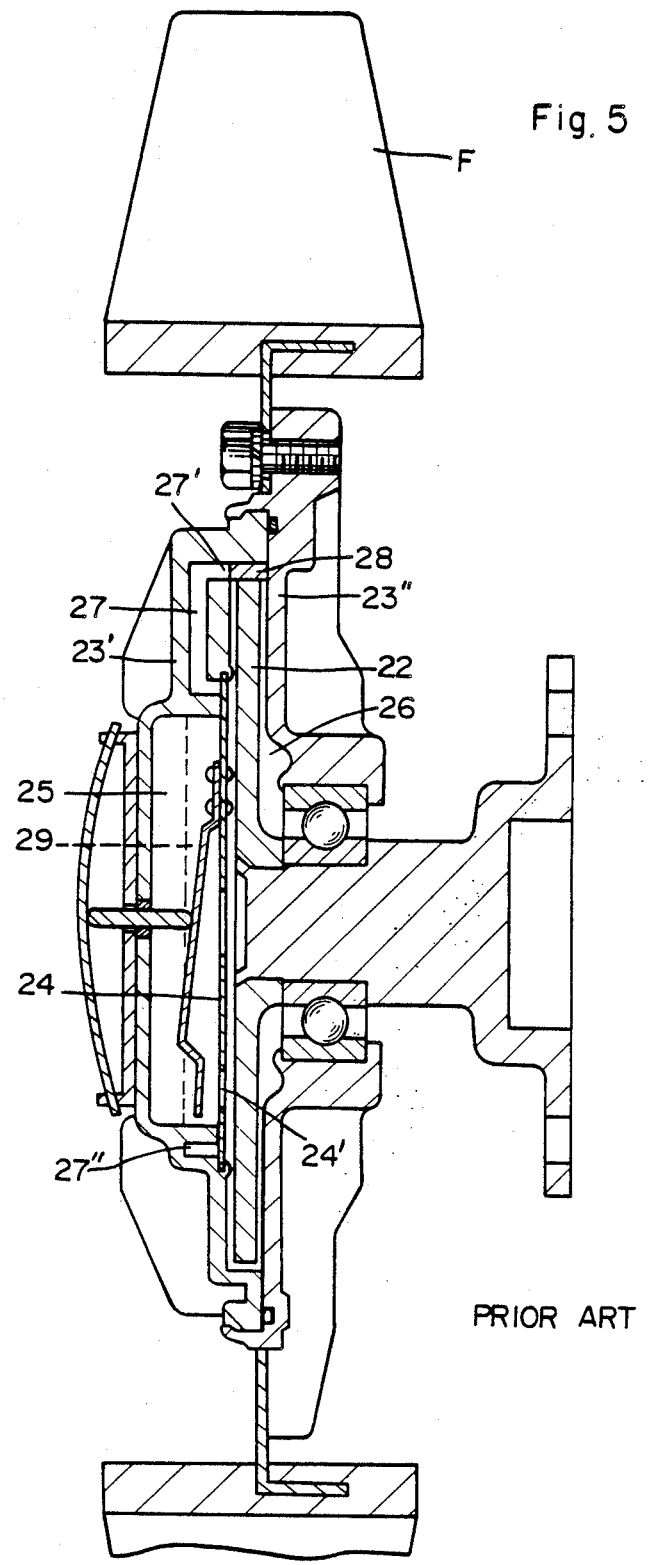
FIG. 5 is a vertical sectional view of a conventional fan coupling.

In FIGS. 1 through 4, reference numeral 1 designates a rotary shaft having a drive disk 7 at the top end, and a fitting flange wall (not shown) at the rear end, thereof and supporting through a bearing (B) a sealed box comprising a cover 3 attached with a cooling fan (not shown) and a casing 2.

Reference numeral 5 designates a partition plate which divides the sealed box into an oil chamber 6 and a torque transmission chamber 4 incorporating the drive disk 7 therein. The partition plate 5 is provided with an oil-flow adjusting hole 5' for controlling a flow of oil from the oil chamber 6 to the torque transmission chamber 4. The drive disk 7 is disposed within the torque transmission chamber 4 keeping a fine gap from the opposing wall surface of the sealed box including the partition plate 5 so as to transmit a torque. Reference numeral 5" designates a throughhole passing through the central portion of the partition plate 5 so as to establish natural communication of the oil between the oil chamber 6 and the torque transmission chamber 4 when the engine is at a standstill. Reference numeral 8 designates a valve for opening and closing the oil flow adjusting hole 5'. The valve 8 is arranged such that one end of the valve is riveted to the surface of the partition plate 5 facing the oil chamber 6 with the other end positioned near the oil-flow adjusting hole 5" and interlocks with a thermosensitive element 10 made of a flat bimetal and whose both ends are supported by a support metal 11 fixed to the front face of the cover 3, through a connecting rod 9. Reference numeral 14 designates an idle oil chamber provided continuous with the torque transmission chamber 4 at a position located radially and outwardly in the sealed box and having a volume at least substantially equal to the quantity of oil already pooled in the torque transmission chamber 4 and itself. Reference numeral 12 designates a dam arranged in the idle oil chamber 14. The dam 12 is formed of a platelike rocking strip connected to the chamber 14 and attached with a pin 12' at the center thereof. Further, it has weight 15 attached to the outer end thereof with the other end being suspended by a tension spring 16 fixed to the chamber 14 so that it forms itself an opening and closing mechanism with respect to the oil circulation passage 13. That is, when the dam 12, which is located near the inlet port 13' of the circulation passage 13 between the torque transmission chamber 4 and the oil chamber 6, is turned forward in the rotational direction thereof, it rocks due to a centrifugal force applied on the weight 15. Thus, during the time between restarting and stoppage of the engine, the oil in the torque transmission chamber 4 is immediately discharged into the idle oil chamber 14 and since, in this case, the dam 12 is held open (as shown by the dotted line of FIG. 2 and FIG. 4) due to the actions of the spring means 16 and the weight 15, the oil flows through the idle oil chamber 14 without any resistance thereby preventing reverse flow of the oil into the torque transmission chamber 4 and the phenomenon of "attendant rotation" of the sealed box after restarting of the engine.

Next, when the engine begins to operate normally to accelerate the drive disk 7 and the speed of rotation of the driven-side sealed box increases, a centrifugal force is applied on the weight 15 so that the dam 12 blocks entry of the oil into the idle oil chamber 14 against the spring 16 (See the solid lines of FIG. 2 and FIG. 3) and due to its pumping action, the oil is caused to flow into the oil chamber 6 to the torque transmission chamber 6 through the circulation passage 13.

Further, it should be noted that the tension spring 16 may be substituted by a compression spring and the tensile force of the spring 16 and the weight of the weight 15 are so selected that the dam 12 does not rock when the phenomenon of "attendant rotation" of the driven side takes place while, on the other hand, it rocks when the engine is in normal operation.

Reference numeral 17 designates an auxiliary dam provided adjacent to the inlet port 13' and reference numeral 18 designates an antiabrasive member made of metal or resin material such as TEFLON both of which dam and member may be provided according to necessity.

The bimetal thermosensitive member 10 may be made spiral instead of the shape in the instant embodiment so that it causes the valve 8 to slide right and left with respect to the flow adjusting hole 5' of the partition plate 5 so as to open and close the latter in response to the deformation of the member 10 due to its right and left movements in the circumferential direction.

As described above, the thermosensitive hydraulic fan coupling according to the present invention has various advantages in that due to the structure of the idle oil chamber 14 and the dam 12 in the chamber 14, the oil in the torque transmission chamber 4 is discharged into the idle oil chamber 14 immediately after restarting the engine so that almost no oil remains in the torque transmission chamber 4 and further, due to the opening of the dam 12, the oil stored in the idle oil chamber 14 during the rotation of the engine from the starting to the stoppage of the engine flows in the chamber 14 without resistance so that the reverse flow of the oil to the torque transmission chamber 4 is prevented and the life of the oil is extended by the oil cooling effect due to its flow in the chamber 14 thereby preventing the "attendant rotation" of the driven side by the synergism of the above-mentioned effects and further that since the pumping action of the dam 12 is secure, a stabilized control can be performed.

What is claimed is:
1. In a thermosensitive hydraulic fan coupling comprising: a sealed box defined by a cover and a casing, said cover being supported, through a bearing, by a rotary shaft having a drive disk at one end thereof and a cooling fan attached to the outer periphery thereof; a partition plate having an oil flow adjusting hole and dividing said sealed box into an oil chamber and a torque transmission chamber housing said drive disk therein and providing therein an idle oil chamber in opposite relationship with the outer periphery of said drive disk; a dam provided at a part of the inner peripheral surface of said sealed box facing the outer periphery of said drive disk around which oil collects at the time of rotation of said disk; an oil circulation passage having an inlet port and an outlet port and adapted to establish communication between said torque transmission chamber and said oil chamber; and a valve means operative in response to a deformation of a thermosensitive member formed on the front face of said cover so that when the ambient temperature exceeds a predetermined value to deform said thermosensitive member, the valve means opens the oil flow adjusting hole of said partition plate while when the ambient temperature drops below said predetermined value, it closes said oil flow adjusting hole, whereby a torque is transmitted from said rotary shaft to said sealed box due to a change in the contact area of the oil in a torque transmission gap formed between opposing surfaces of said drive disk and said casing and cover, THE IMPROVEMENT characterized in that said dam comprises a platelike rocking strip provided within said idle oil chamber at a position near the inlet port of said circulation passage so as to be forwardly of said circulation passage in a rotational direction of the disk and serves as an opening and closing mechanism for said circulation passage with the aid of a predetermined centrifugal force applied on the platelike rocking strip.

2. A fan coupling according to claim 1, wherein said opening and closing mechanism comprises a pin attached to a central portion of said platelike rocking strip, a weight attached to one end of said rocking strip and a spring means for constantly urging said weight toward the center of rotation of said disk.

3. A fan coupling according to claim 2, wherein said spring means is a tension spring applied between one end of said platelike rocking strip and the inner wall of said sealed box.

4. A fan coupling according to claim 2, wherein said spring means comprises a compression spring applied between said platelike rocking strip and said auxiliary dam.

5. A fan coupling according to claim 1, wherein said platelike rocking strip includes an antiabrasive portion at least one end thereof.

6. A fan coupling according to claim 1, wherein an auxiliary dam is provided within said idle oil chamber at a position near the inlet port of said oil circulation passage substantially in the circumferential direction.

* * * * *